US012382572B2

(12) United States Patent
Mueller et al.

(10) Patent No.: US 12,382,572 B2
(45) Date of Patent: Aug. 5, 2025

(54) RADIOFREQUENCY SOURCE HAVING A PHASE STABILIZATION ELEMENT

(71) Applicant: Siemens Healthineers AG, Forchheim (DE)

(72) Inventors: Sven Mueller, Urbich (DE); Stefan Willing, Rudolstadt (DE); Martin Koschmieder, Uhlstaedt-Kirchhasel (DE); Claudia Noak, Uhlstaedt-Kirchhasel (DE); Marvin Moeller, Jena (DE); Stefan Setzer, Eckental (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 147 days.

(21) Appl. No.: 18/173,276

(22) Filed: Feb. 23, 2023

(65) Prior Publication Data

US 2023/0276565 A1 Aug. 31, 2023

(30) Foreign Application Priority Data

Feb. 25, 2022 (EP) .................................... 22159014

(51) Int. Cl.
*H05H 7/22* (2006.01)
*H05H 7/04* (2006.01)
*H05H 9/00* (2006.01)

(52) U.S. Cl.
CPC ................ *H05H 7/22* (2013.01); *H05H 7/04* (2013.01); *H05H 9/00* (2013.01)

(58) Field of Classification Search
CPC ............... H05H 7/22; H05H 7/04; H05H 9/00
See application file for complete search history.

(56) References Cited

U.S. PATENT DOCUMENTS

| | | | | |
|---|---|---|---|---|
| 3,714,592 A | | 1/1973 | Jory | |
| 5,291,290 A | * | 3/1994 | Vaughan | H01P 1/39 333/1.1 |
| 2009/0140177 A1 | * | 6/2009 | Whittum | H05G 1/025 250/493.1 |

FOREIGN PATENT DOCUMENTS

| | | |
|---|---|---|
| DE | 102012209185 A1 | 12/2013 |

OTHER PUBLICATIONS

Peng, Chengyao et al. "Design of temperature compensating unit for the circulator in 6 MW 4.6 GHz LHCD system"; Fusion Engineering and Design; vol. 112, pp. 198-203, Nov. 15, 2016 (Year: 2016).*
Kim, Jeehyun et al. "Test and operation of high-power RF system for KSTAR helicon current drive system"; Fusion Engineering and Design; vol. 166, Apr. 9, 2021, pp. 1-6 (Year: 2021).*
Harish V. Dixit et al.: "Design of the 3.7GHz, 500KW CW circulator for the LHCD system of the SST-1 tokamak" in Fusion Engineering and Design, vol. 119, 2017, pp. 51-60, ISSN 0920-3796, https://doi.org/10.1016/j.fusengdes.2017.04.085.

(Continued)

*Primary Examiner* — Abdulmajeed Aziz
*Assistant Examiner* — Nathaniel J Lee
(74) *Attorney, Agent, or Firm* — Harness, Dickey & Pierce, P.L.C.

(57) ABSTRACT

One or more example embodiments of the present invention relates to a radiofrequency source for a linear accelerator system, to the linear accelerator system, to a method for operating a radiofrequency source, and to an associated computer program product.

18 Claims, 10 Drawing Sheets

(56) References Cited

OTHER PUBLICATIONS

Peng, Chengyao et al: "Design of temperature compensating unit for the circulator in 6 MW 4.6 GHz LHCD system"; Fusion Engineering and Design; vol. 112, pp. 198-203, 15. Nov. 2016, XP055938067.
Kim, Jeehyun et al: "Test and operation of high-power RF system for KSTAR helicon current drive system"; Fusion Engineering and Design; vol. 166, 9. Apr. 2021, pp. 1-6, XP086540274.

* cited by examiner

RADIOFREQUENCY SOURCE HAVING A PHASE STABILIZATION ELEMENT

CROSS-REFERENCE TO RELATED APPLICATION(S)

The present application claims priority under 35 U.S.C. § 119 to European Patent Application No. 22159014.4, filed Feb. 25, 2022, the entire contents of which are incorporated herein by reference.

FIELD

One or more example embodiments of the present invention relates to a radiofrequency source for a linear accelerator system, to the linear accelerator system, to a method for operating a radiofrequency source, and to an associated computer program product.

RELATED ART

Radiofrequency sources are routinely employed for providing high-frequency microwaves, for instance used for accelerating charged particles, in particular electrons, in a conventional linear accelerator system. DE 10 2012 209 185 A1 discloses an example of such a radiofrequency source for a linear accelerator.

The linear accelerator system provides, depending on the type of use, high-energy charged particles or MeV photons, in particular MeV X-ray radiation, with the latter typically produced by the interaction of the charged particles with a target in the linear accelerator unit. The linear accelerator system is used, for example, in customs checks and/or in materials testing. Its use in beam therapy and/or medical imaging is also conceivable in principle and generally known.

Such a linear accelerator system typically comprises two of three main components, which conventionally interact in a facility. A first main component is the linear accelerator unit. A further main component is a supply module, which is configured to provide and/or control by open-loop and/or closed-loop means the electric voltages and/or currents needed for the (other) main components, and comprises the radiofrequency source, for example. A third main component is a cooling system, for example called a chiller.

The cooling system is normally used for stabilizing the temperature of the radiofrequency source, in particular of a circulator of the radiofrequency source. Temperature stabilization means in particular temperature control. In particular, the cooling system is a temperature control system. The cooling system provides for the temperature stabilization in particular a cooling capacity or heating capacity. In particular, the temperature stabilization comprises temperature control, i.e. cooling and/or heating. Without temperature stabilization, a temperature change typically results in an additional phase shift in the ferrites of the circulator. The additional phase shift usually has a detrimental effect on the level of isolation of the microwave generator to backscattered microwaves. The isolation typically requires the generated microwaves to have a certain phase with respect to the backscattered microwaves.

A conventional cooling system of this type normally needs about ⅓ to ½ of the installation space of the facility, and ⅓ to ½ of the consumed electrical power of the facility. This requirement for installation space and/or electrical power increases overall the demands placed on the environment that accommodates the facility. Operating a conventional facility presents a corresponding challenge, in particular if the facility is deployed on a mobile platform. The mobile platform may be part of a truck, for example.

Usually the facility can be operated only with reduced beam performance if the environment accommodating the facility cannot fully satisfy the demands. The reduced beam performance allows a reduction in the cooling capacity of the cooling system and hence in the installation space and/or electrical power required. Alternatively or additionally, it is conventionally possible to scale down the facility, in particular the cooling system, by the facility obtaining some of the cooling capacity through shared usage of another, existing cooling system. The latter requires relatively high system integration and/or interfacing to further systems, however, which usually increases the complexity of the facility.

SUMMARY

One or more example embodiments of the present invention defines a radiofrequency source for a linear accelerator system, said linear accelerator system, a method for operating a radiofrequency source, and an associated computer program product having an increased temperature working range.

According to one or more example embodiments, a radiofrequency source for a linear accelerator system includes a microwave generator configured to generate microwaves; a control unit; and a circulator, the circulator having ferrites to isolate the microwave generator from backscattered microwaves by influencing a phase of the microwaves according to a magnetic field, the circulator including an electrical phase stabilization element, the control unit being configured to receive a measured variable describing a magnetic permeability of the circulator, the control unit being further configured to adjust at least one of a current of the electrical phase stabilization element or a voltage of the electrical phase stabilization element to influence the magnetic field based on the received measured variable such that an amplitude difference between the generated microwaves and the backscattered microwaves is a maximum.

According to one or more example embodiments, the electrical phase stabilization element includes a controllable inductive component, the at least one of the adjusted current of the electrical phase stabilization element or the adjusted voltage of the electrical phase stabilization element runs through the controllable inductive component.

According to one or more example embodiments, the controllable inductive component has at least one electromagnetic coil.

According to one or more example embodiments, the electrical phase stabilization element further includes a permanent magnet, the at least one electromagnetic coil being wound around the permanent magnet.

According to one or more example embodiments, the electrical phase stabilization element includes a controllable thermoelectric component configured to control a temperature inside the circulator, the at least one of the adjusted current of the electrical phase stabilization element or the adjusted voltage of the electrical phase stabilization element runs through the controllable thermoelectric component.

According to one or more example embodiments, the controllable thermoelectric component is a thermoelectric converter.

According to one or more example embodiments, the radiofrequency source further includes a measuring apparatus configured to measure an electromagnetic variable of the backscattered microwaves, the measured electromagnetic variable being the measured variable describing the magnetic permeability of the circulator.

According to one or more example embodiments, the electromagnetic variable describes at least one of an amplitude of the backscattered microwaves or a phase of the backscattered microwaves.

According to one or more example embodiments, the radiofrequency source further includes a directional coupler configured to separate the generated microwaves and the backscattered microwaves, the directional coupler being between the measuring apparatus and the circulator.

According to one or more example embodiments, a linear accelerator system includes a radiofrequency source according to one or more example embodiments; and a linear accelerator unit, the linear accelerator unit including a particle emitter configured to emit charged particles, and cavities configured to accelerate the charged particles via the microwaves.

According to one or more example embodiments, the linear accelerator unit includes a target inside the cavities, the target configured to produce MeV X-ray radiation based on the accelerated charged particles.

According to one or more example embodiments, a method for operating the radiofrequency source includes receiving in the control unit the measured variable describing the magnetic permeability of the circulator; and adjusting the at least one of the current of the electrical phase stabilization element or the voltage of the electrical phase stabilization element such that the amplitude difference between the generated microwaves and the backscattered microwaves is maximized.

According to one or more example embodiments, a non-transitory computer program product includes program code that, when executed by a control unit, causes the control unit to perform a method according to one or more example embodiments.

BRIEF DESCRIPTION OF THE DRAWINGS

The invention is described and explained in greater detail below with reference to the exemplary embodiments shown in the figures, where the same reference signs are generally used in the following description of the figures to denote structures and units that remain substantially the same as in the first appearance of the structure or unit concerned, and in which.

DETAILED DESCRIPTION

Figure 1:
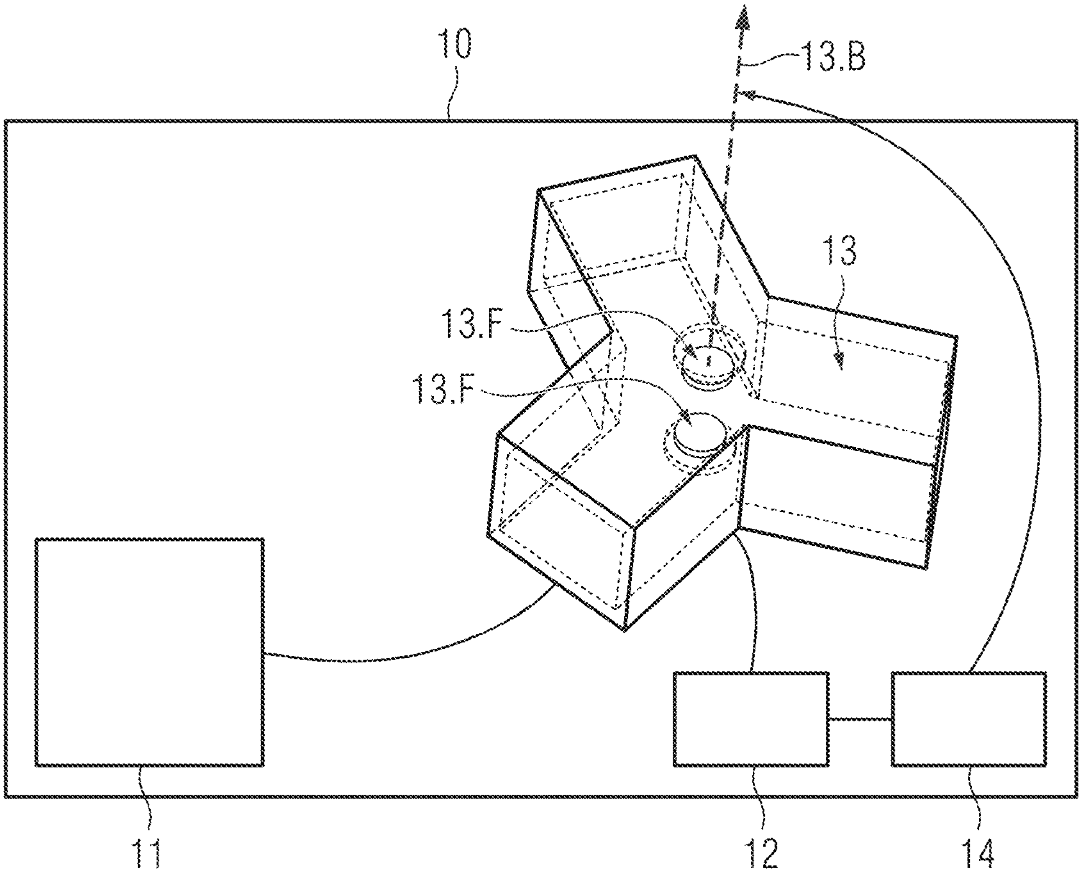
FIG. 1 shows a radiofrequency source according to one or more example embodiments.

A radiofrequency source according to one or more example embodiments of the present invention for a linear accelerator system has

- a microwave generator for generating microwaves,
- a control unit, and
- a circulator, which has ferrites for isolating the microwave generator from backscattered microwaves by influencing the phase of the microwaves according to a magnetic field, characterized in that the circulator has an electrical phase stabilization element, and the control unit is designed to receive a measured variable describing a magnetic permeability of the circulator, and to adjust in such a way a current and/or voltage of the electrical phase stabilization element for influencing the magnetic field according to the received measured variable that an amplitude difference between the generated microwaves and the backscattered microwaves is a maximum.

A method according to one or more example embodiments of the present invention for operating the radiofrequency source has the following steps:

- receiving in the control unit the measured variable describing the magnetic permeability of the circulator;
- adjusting via the control unit the current and/or voltage of the electrical phase stabilization element for influencing the magnetic field according to the measured variable that the amplitude difference between the generated microwaves and the backscattered microwaves is maximized.

The method for operating the radiofrequency source essentially comprises open-loop or closed-loop control of the radiofrequency source.

An advantage of said radiofrequency source or of operating said radiofrequency source in such a way is that the radiofrequency source according to one or more example embodiments of the present invention advantageously needs substantially less installation space and/or electrical power than a conventional radiofrequency source. This advantage is realized, for example, by the electrical phase stabilization element in the radiofrequency source actively counteracting temperature variations, which in particular result in changes in the magnetic permeability and hence in particular in the phase of the microwaves.

The radiofrequency source uses active closed-loop control of the electrical phase stabilization element to compensate for preferably partial or complete loss of cooling capacity that can normally be used for stabilizing the temperature of the radiofrequency source. The compensation comprises in particular thermoelectric and/or electromagnetic compensation.

The microwave generator comprises in particular a magnetron or a klystron. At an input of the microwave generator typically lies a high voltage, which the microwave generator converts into high-frequency microwaves at its output, which have a radiofrequency power that depends on the high voltage. The microwave generator in particular generates an alternating electromagnetic field in the GHz region, in particular between 1 and 10 GHz, preferably between 2 and 4 GHz, in the form of microwaves. The generated microwaves are suitable in particular for accelerating charged particles.

The generated microwaves are defined as those microwaves that are produced by the microwave generator. The generated microwaves are in particular microwaves in a forward direction. Backscattered microwaves are in particular microwaves in a reverse direction. The backscattered microwaves are in particular those microwaves that are backscattered at a useful load of the circulator, for example at the linear accelerator system, and/or at the circulator itself, in particular according to the generated microwaves.

In particular, the circulator has at least 3 ports, where the first port can be connected to the microwave generator, where the second port can be connected to a useful load, in particular to a linear accelerator unit of the linear accelerator system, and where the third port can be connected to a load in particular for absorbing backscattered microwaves. A 3-port circulator of this type is typically Y-shaped, with the arms arranged at a 120° offset. In principle, it is conceivable that the circulator has a fourth port, which can be connected, for example, to a reflection phase shifter or a further load. During operation, the circulator is connected at each port typically via a waveguide, for example. The load and/or the further load can be a water load in particular.

In particular, the circulator is a ferrite circulator. The circulator has the ferrites, which are arranged and designed in such a way that the generated microwaves and the backscattered microwaves are separated from each other, and/or the backscattered microwaves are not fed back to the microwave generator. The circulator typically has a further permanent magnet for magnetizing the ferrites. The ferrites can hence act in particular as an isolator because the ferrites are exposed to a magnetic field.

A frequency range of the microwaves to be separated in the circulator can be adjusted advantageously via the control unit. The circulator is advantageously a largely temperature-independent circulator thanks to the electrical phase stabilization element. The circulator of the radiofrequency source preferably has a larger temperature working range than a conventional circulator because the electrical phase stabilization element can counterbalance temperature variations. The temperature working range of the circulator equals in particular at least ±2° C., preferably at least ±5° C., advantageously at least ±20° C., particularly advantageously at least ±50° C. The preferred working temperature of the circulator equals, for example, 30° C., 40° C., 60° C. or 80° C., and lies in the corresponding temperature working range. The temperature working range of ±° C. refers to the working temperature and not necessarily to 0° C., for example. In the temperature working range, the radiofrequency source, in particular the circulator, can be operated optimally, preferably sufficiently well. Within the temperature working range, i.e. from a lower limit to an upper limit, the microwaves passing through the circulator preferably have substantially the same phase as a result of the closed-loop control via the electrical phase stabilization element.

In particular, the control unit can be a processing unit or can form part of a processing unit. In particular, the control unit has an input interface for receiving the measured variable. The measured variable in particular reflects a magnitude of the magnetic permeability. The measured variable can be vector-based. In particular, the measured variable can have a time resolution. The control unit can be designed in particular to initiate or trigger the measurement by the measuring apparatus. The control unit can trigger the measurement repeatedly. The measurement can be carried out in cycles and/or continuously.

The control unit can be part of a measuring apparatus or be connected to the measuring apparatus by wired or wireless communications. The control unit can use the input interface in particular to receive, store in a buffer memory unit and/or process, as part of the adjustment, the measured variable. The processing is carried out in particular according to a logic circuit and/or an algorithm. The processing can be carried out in particular according to program code means that model the logic circuit and/or the algorithm. The processing can be carried out by digital and/or analog means. In particular, the processing can be carried out repeatedly. As part of adjusting the current and/or voltage of the electrical phase stabilization element, in particular the measured variable is processed, for instance after the measured variable is received and/or stored in the buffer memory unit.

Adjusting the current and/or voltage comprises in particular processing the measured variable and/or ascertaining a control value. The ascertained control value can appear at an output interface of the control unit. Alternatively or additionally, the control unit can be designed to use the ascertained control value to apply the current and/or voltage to the electrical phase stabilization element.

The current and/or voltage are adjusted, for example, repeatedly, preferably in cycles and/or continuously, in particular according to the logic circuit and/or the algorithm. The adjustment means in particular solving an optimization problem with the objective of maximizing the amplitude difference and/or minimizing the radiofrequency power of the backscattered microwaves. The aim of the logic circuit and/or the algorithm in particular is that the amplitude difference is a maximum or is maximized. In other words, the adjustment is carried out repeatedly until the amplitude difference is a maximum. The adjustment can cause the amplitude difference to become smaller compared with the previous amplitude difference. Advantageously, the control unit uses the subsequent adjustment to correct the amplitude difference that is getting smaller.

The amplitude difference being a maximum means in particular that the circulator is capable of providing isolation during operation of the radiofrequency source. In other words, the electrical phase stabilization element ensures the isolation capability of the circulator during operation. The isolation capability of the circulator depends in particular on the magnetic field provided at the ferrites and the temperature of the ferrites.

The amplitude difference being a maximum means in particular that the radiofrequency power transmitted by the generated microwaves is substantially greater than the radiofrequency power transmitted by the backscattered microwaves. An insertion loss lies advantageously below 1 dB. In particular, the loss in the reverse direction is greater than 20 dB, preferably greater than 30 dB. The amplitude difference being a maximum typically means that the radiofrequency power of the backscattered microwaves is a minimum.

The magnitude of the maximum amplitude difference can vary in particular according to the time at which the measured variable is measured. For example, the radiofrequency source provides the radiofrequency power in a time-definable manner in the form of microwaves with a certain pulse length. At the pulse start, the radiofrequency power of the backscattered microwaves is typically greater than the radiofrequency power of the backscattered microwaves in the steady state.

Adjusting the current and/or voltage comprises in particular closed-loop control of the electrical phase stabilization element. The effect of the adjustment is in particular that the measured variable influences the magnetic field via the electrical phase stabilization element. In particular, the adjustment makes it possible to compensate for an unwanted permeability deviation and hence of a magnetic field deviation. The adjusted current and/or adjusted voltage have a direct influence on the magnetic field at the ferrites in the circulator. The electrical phase stabilization element can have an input interface for receiving the control value.

In particular, the electrical phase stabilization element is part of the circulator. The electrical phase stabilization element consumes electrical power according to the adjusted current and/or adjusted voltage. The electrical phase stabilization element in particular is in direct physical contact with the circulator. The electrical phase stabilization element is fixedly connected and/or coupled to the circulator. The electrical phase stabilization element produces, according to the adjusted current and/or voltage, in particular an effect in close proximity to the circulator and/or in close proximity to, or at, the ferrites. For example, the electrical phase stabilization element influences the magnetic field by superimposing a further magnetic field on the magnetic field, and/or by influencing the permeability of the ferrites. Influencing the magnetic field comprises in particular changing the magnitude and/or orientation of the magnetic field.

According to one embodiment, the electrical phase stabilization element for influencing the magnetic field has a controllable inductive component, through which the adjusted current and/or adjusted voltage runs. In this embodiment, the further magnetic field of the inductive component is superimposed on the magnetic field provided at the ferrites. This embodiment is advantageous in particular because the magnetic field is controlled directly, which can typically be carried out relatively quickly.

According to one embodiment, the inductive component has at least one electromagnetic coil. The at least one electromagnetic coil advantageously allows the magnetic field to be influenced precisely by the application of the adjusted current and/or adjusted voltage. The at least one electromagnetic coil is arranged on one of the ferrites, for example. In addition, a further electromagnetic coil can be arranged at another ferrite. The arrangement of the ferrites and the at least one electromagnetic coil is typically symmetrical. The coil is made of copper, for example.

According to one embodiment, the electrical phase stabilization element additionally has a permanent magnet around which is wound the at least one electromagnetic coil. As an alternative, the electromagnetic coil can be wound around the further permanent magnet. The at least one electromagnetic coil and the permanent magnet or the further permanent magnet in particular form a particularly advantageous controllable magnet for influencing the magnetic field. In order to close a magnetic circuit, a U-shaped yoke can be arranged around the at least one electromagnetic coil and around the permanent magnet or the further permanent magnet.

According to an embodiment, the electrical phase stabilization element for influencing the magnetic field has a controllable thermoelectric component, through which the adjusted current and/or adjusted voltage runs, for closed-loop control of a temperature inside the circulator. The embodiment utilizes in particular the physical effect of the temperature dependence of the isolation capability of the circulator, where the temperature in turn influences the permeability. For example, if the measured variable indicates a relatively low isolation capability, it is possible to restore the isolation capability in part, preferably in full or to a maximum via the closed-loop control of the temperature. The thermoelectric component advantageously allows closed-loop temperature control of the circulator. Typically, the thermoelectric component is thermally coupled directly to the circulator, in particular to the ferrites. It is conceivable in principle that a heat-exchanging element, for instance a heat sink and/or a gaseous or fluid-based cooling circuit, is provided between the thermoelectric component and the circulator.

According to one embodiment, the thermoelectric component is a thermoelectric converter, in particular a Peltier element. The thermoelectric converter allows precise closed-loop control of the temperature of the circulator, in particular of the ferrites, according to the adjusted current and/or adjusted voltage.

According to one embodiment, the radiofrequency source has a measuring apparatus for measuring an electromagnetic variable of the backscattered microwaves, which electromagnetic variable is the measured variable describing the magnetic permeability of the circulator.

According to one embodiment, the electromagnetic variable describes an amplitude and/or a phase of the backscattered microwaves. The electromagnetic variable can be referenced or normalized in particular in respect of an electromagnetic variable of the generated microwaves. For example, it is conceivable to calculate an amplitude difference and/or a phase difference between the generated microwaves and the backscattered microwaves. The control unit is designed in particular to compare the electromagnetic variable with a set point, for example. The set point can be a constant value or depend on the magnetic field. For example, the set point can be a value between 0 and 2n if the electromagnetic variable describes the phase of the backscattered microwaves. The set point can be a value of a function, in particular a parabolic function, of the magnitude of the magnetic field if the electromagnetic variable describes the amplitude of the backscattered microwaves.

According to one embodiment, a directional coupler for separating the generated microwaves and the backscattered microwaves is provided between the measuring apparatus and the circulator. This embodiment advantageously allows the generated microwaves to be viewed separately from the backscattered microwaves.

The linear accelerator system according to one or more example embodiments of the present invention has the radiofrequency source and a linear accelerator unit, which linear accelerator unit has a particle emitter for emitting charged particles, in particular electrons, and cavities for accelerating the charged particles, in particular the electrons, via the microwaves. Since the linear accelerator system according to one or more example embodiments of the present invention comprises the radiofrequency source according to one or more example embodiments of the present invention, it shares the advantages described above. The linear accelerator system is designed in particular for beam therapy, materials testing and/or security checks.

The linear accelerator system is used in particular to accelerate the charged particles, which in particular are electrons, along a straight line. The charged particles are accelerated via the radiofrequency source to energies greater than 1 MeV and typically less than 20 MeV, for example in the range 3 to 9 MeV.

In particular, the particle emitter can be an electron emitter. The electron emitter in particular has a thermionic emitter, for example a filament emitter or a spherical emitter, or a cold emitter, for example containing carbon tubes or made of silicon. The electron emitter can have a grid for controlling the firing of the electrons.

The cavities are in particular linear accelerator cavities and are typically evacuated. In particular, the cavities form a standing-wave accelerator or a traveling-wave accelerator. The cavities are typically connected to one another and arranged one after the other in a row, so that the charged particles travel through the cavities in succession. The particle emitter is usually arranged at the one end of the row of cavities, and an output aperture typically at the other end. The output aperture can be sealed by a vacuum-tight window.

According to one embodiment, the linear accelerator unit has a target, which is provided inside the cavities, for producing MeV X-ray radiation on the basis of the accelerated charged particles. The target is typically arranged at an end of the row of cavities opposite the particle emitter. For example, the target can be part of the output aperture and provide a vacuum-tight seal of the output aperture. In particular, the target is a transmission target. The charged particles typically hit the surface of the target at a right angle. The target typically has the shape of a rondel. The rondel is a cylindrical body that usually has a small height compared with its diameter. The target consists in particular of a material with a high atomic number (proton number, Z) and/or a high density, for example silver, copper, gold, aluminum, rhodium, tungsten, molybdenum, rhenium, zirconium, chromium, cobalt, iron, manganese, vanadium, titanium, tantalum, indium, iridium or beryllium, or an alloy of the conventional target materials specified above. In particular, the target material of the target can be tungsten. Advantageously, the target comprises rhenium, for example, in addition to the tungsten so that the target is tougher and hence more robust. The target can be in contact with a cooling medium on a side facing away from the electron beam.

The linear accelerator system containing the radiofrequency source can be deployed in a stationary or mobile manner, for example. The linear accelerator system can be operated advantageously without a dedicated cooling system, or with a cooling system of relatively low cooling capacity. The linear accelerator system and/or the radiofrequency source can preferably be cooled passively.

The computer program product can be a computer program or comprise a computer program. The computer program product comprises in particular the program code means that model the method steps according to one or more example embodiments of the present invention. It is thereby possible to define and repeatedly perform the method according to one or more example embodiments of the present invention, and to exercise control over disseminating the method according to one or more example embodiments of the present invention. The computer program product is preferably configured such that the processing unit can use the computer program product to perform the method steps according to one or more example embodiments of the present invention. The program code means can be loaded in particular into a memory of the processing unit, and typically can be executed by a processor of the processing unit with access to the memory. When the computer program product, in particular the program code means, is executed in the processing unit, typically all the embodiments according to the invention of the described method can be implemented. The computer program product is stored, for example, on a physical, computer-readable medium and/or digitally as a data packet in a computer network. The computer program product can constitute the physical, computer-readable medium and/or the data packet in the computer network. Hence one or more example embodiments of the present invention can also proceed from said physical computer-readable medium and/or from said data packet in the computer network. The physical, computer-readable medium can usually be connected directly to the processing unit, for instance by inserting the physical, computer-readable medium into a DVD drive or by plugging same into a USB port, whereby the processing unit can have access, in particular read access, to the physical, computer-readable medium. The data packet can preferably be retrieved from the computer network. The computer network can comprise the processing unit or be connected directly to the processing unit via a wide area network (WAN) connection and/or via a (wireless) local area network (WLAN or LAN) connection. For instance, the computer program product may be held digitally on a Cloud server at a storage location of the computer network, and be transferred via the WAN via the Internet and/or via the WLAN or LAN to the processing unit, in particular by opening a download link that points to the storage location of the computer program product.

Features, advantages or alternative embodiments mentioned in the description of the device can also be applied to the method, and vice versa. In other words, claims relating to the method can be developed by features of the device, and vice versa. In particular, the device according to one or more example embodiments of the present invention can be used in the method.

FIG. 1 shows in a schematic block diagram the radiofrequency source 10 according to one or more example embodiments of the present invention.

The radiofrequency source 10 is designed for a linear accelerator system, which is not shown. The radiofrequency source 10 has a microwave generator 11 for generating microwaves, a control unit 12 and a circulator 13. The control unit 12 is designed for receiving a measured variable describing a magnetic permeability of the circulator 13.

The circulator 13 is a ferrite Y-shaped 3-port circulator, which is shown in a perspective view in FIG. 1, and has ferrites 13.F for isolating the microwave generator 11 from backscattered microwaves by influencing the phase of the microwaves according to a magnetic field 13.B. The magnetic field 13.B is depicted as a dashed directional arrow in FIG. 1 purely for illustrative purposes. The circulator 13 also has an electrical phase stabilization element 14. Connected to the circulator 13 is the microwave generator 11, but there is no connection to a useful load or any load in this exemplary embodiment.

The control unit 12 is designed for adjusting in such a way a current and/or voltage of the electrical phase stabilization element 14 for influencing the magnetic field 13.B according to the received measured variable that an amplitude difference between the generated microwaves and the backscattered microwaves is a maximum.

Figure 2:
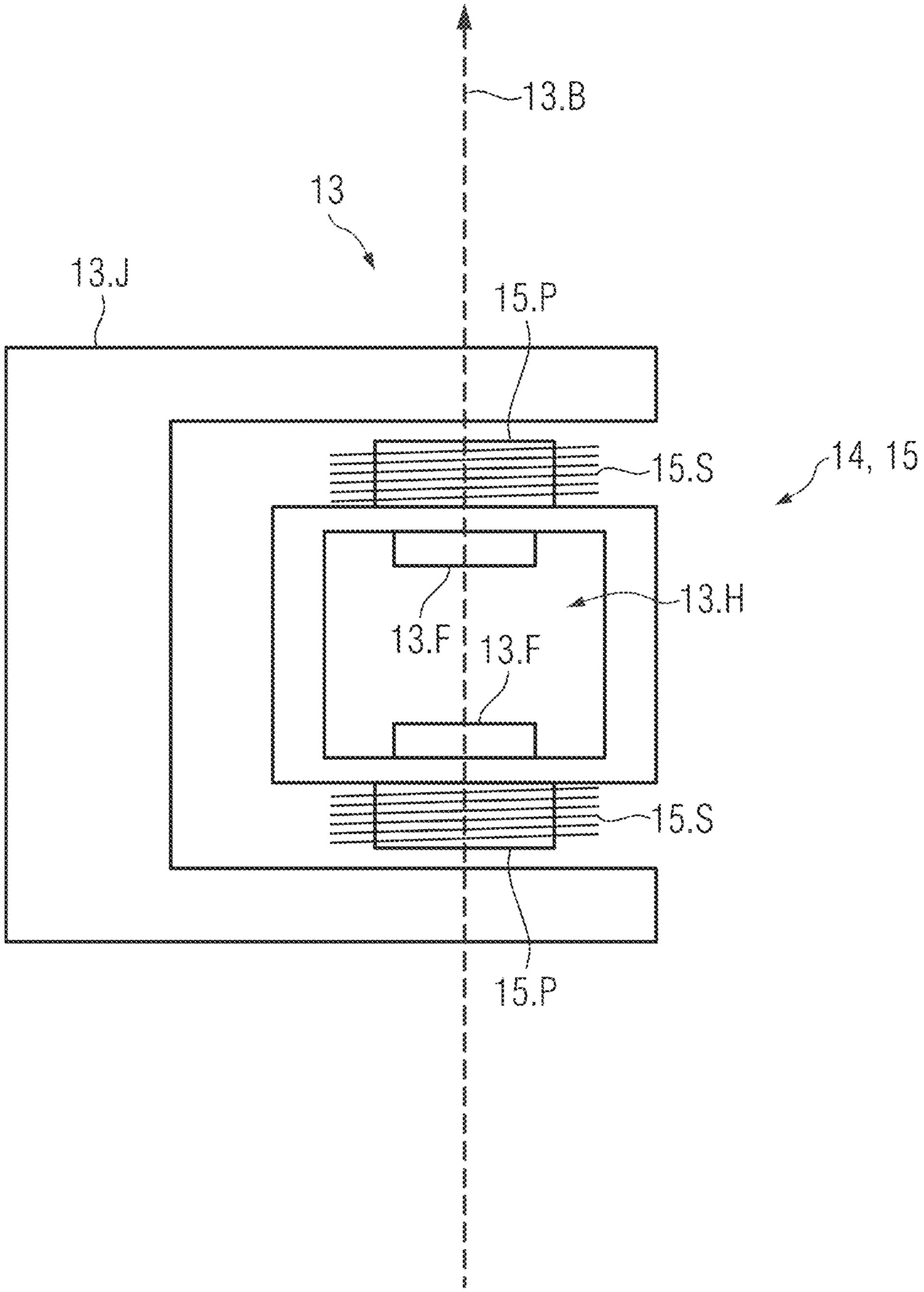
FIG. 2 shows a first exemplary embodiment of the radiofrequency source.

FIG. 2 shows a first exemplary embodiment of the radiofrequency source 10 according to the invention. FIG. 2 shows a central cross-section through the circulator 13.

The electrical phase stabilization element 14 for influencing the magnetic field 13.B has a controllable inductive component 15, through which the adjusted current and/or adjusted voltage runs. The inductive component 15 has at least one electromagnetic coil 15.S. In addition, the electrical phase stabilization element 14 has a permanent magnet 15.P, around which is wound the at least one electromagnetic coil 15.S. FIG. 2 shows two coils 15.S, each wound around one permanent magnet 15.P. The inductive component 14 surrounds the hollow space 13.H of the circulator 13 and surrounds the ferrites 13.F. The ferrites 13.F are arranged advantageously between the two coils 15.S. The magnetic circuit comprises in particular the yoke 13.J, the at least one electromagnetic coil 15.S, the permanent magnet 15.P, the ferrites 13.F and the gap in the hollow space 13. H.

Figure 3:
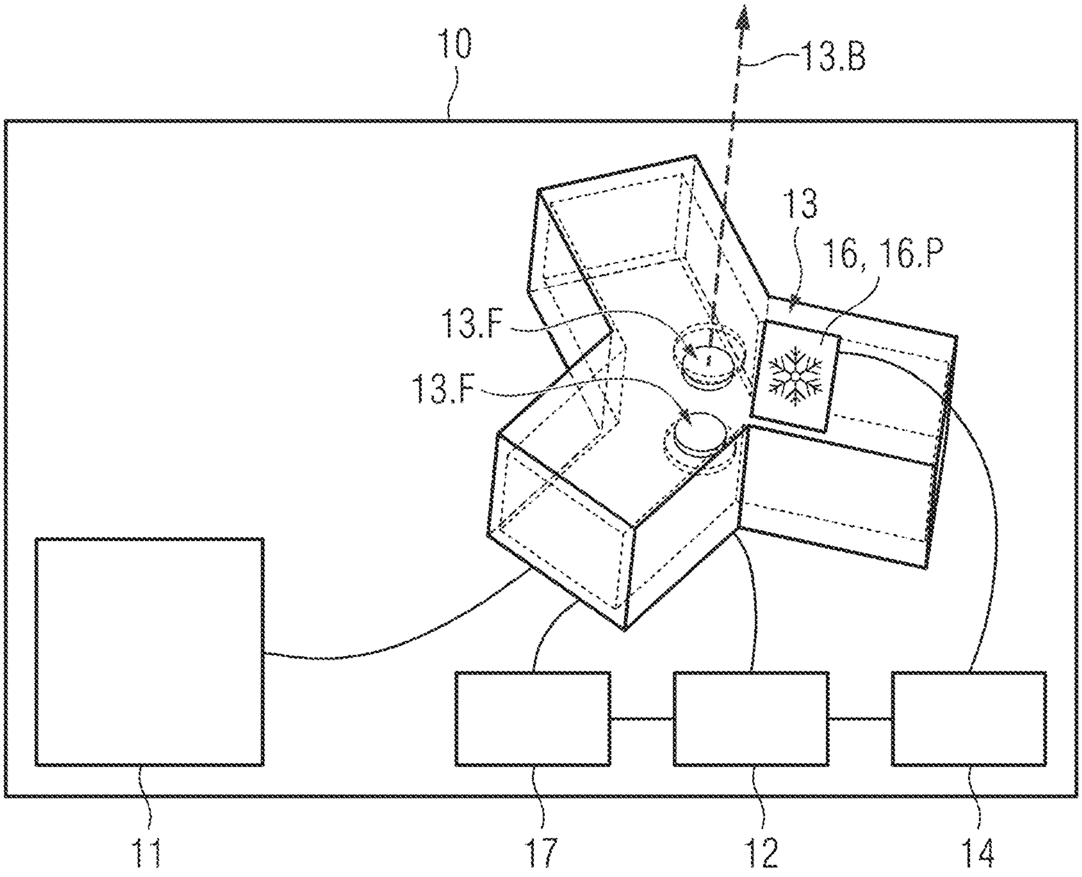
FIG. 3 shows a second exemplary embodiment of the radiofrequency source.

FIG. 3 shows a second exemplary embodiment of the radiofrequency source 10 according to the invention. This exemplary embodiment can be combined explicitly with the exemplary embodiment shown in FIG. 2.

The electrical phase stabilization element 14 has for influencing the magnetic field 13.B a controllable thermoelectric component 16, through which the adjusted current and/or adjusted voltage runs, for controlling a temperature inside the circulator 13. The thermoelectric component 16 is a thermoelectric converter, in particular a Peltier element 16.P. In FIG. 3, the Peltier element 16.P is denoted by a snowflake because the thermoelectric component 16 controls the temperature inside the circulator 13 according to the adjusted current and/or voltage.

FIG. 3 also shows that the radiofrequency source 10 has a measuring apparatus 17 for measuring an electromagnetic variable of the backscattered microwaves, which electromagnetic variable is the measured variable describing the magnetic permeability of the circulator 13. The electromagnetic variable describes an amplitude and/or a phase of the backscattered microwaves. The measuring apparatus 17 is connected to the control unit 12 in order to transfer the measured variable.

Figure 4:
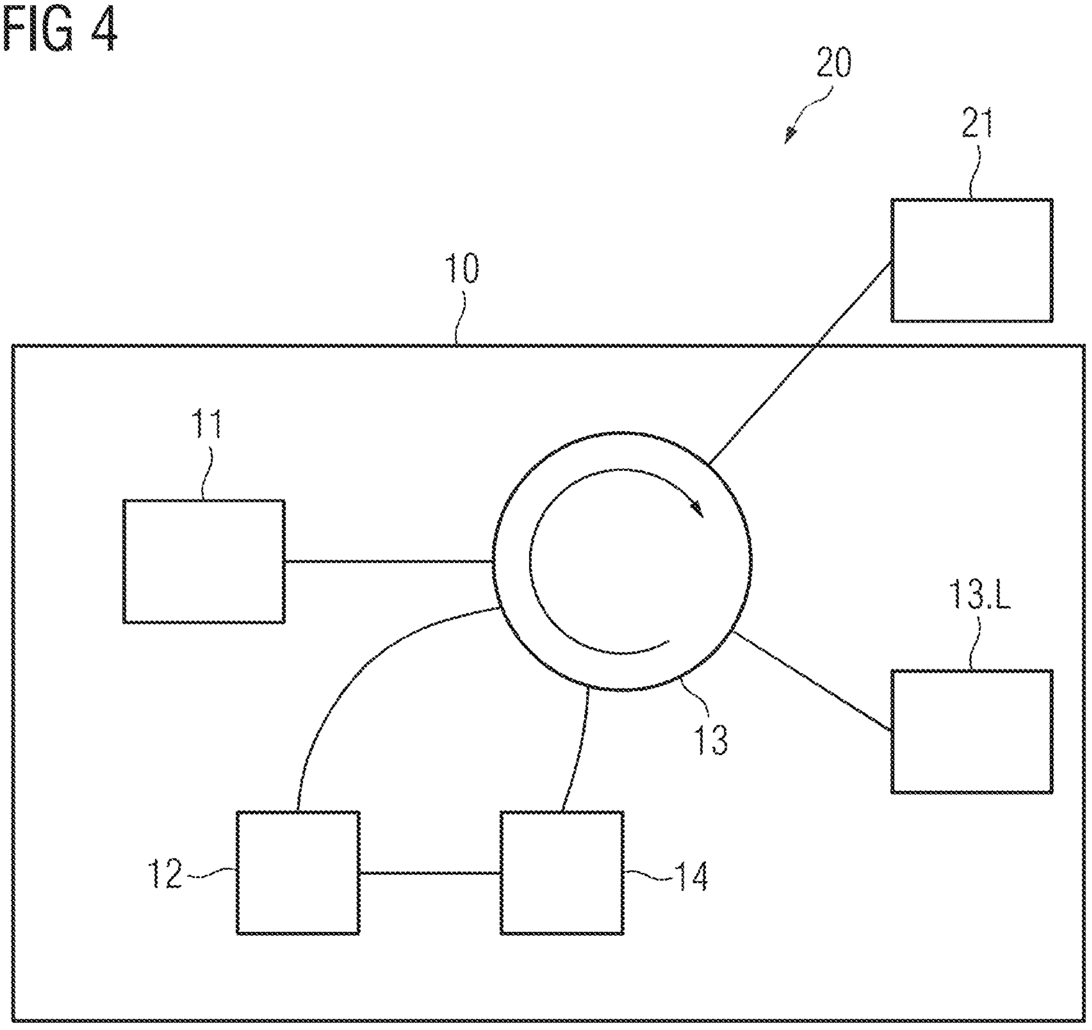
FIG. 4 shows a linear accelerator system according to one or more example embodiments having a 3-port circulator.

FIG. 4 shows a block diagram of a linear accelerator system 20 according to one or more example embodiments of the present invention having a 3-port circulator. The linear accelerator system 20 according to one or more example embodiments of the present invention has a radiofrequency source 10 and a linear accelerator unit 21. The linear accelerator unit 21 has a particle emitter for emitting charged particles, and cavities for accelerating the charged particles via the microwaves. The circulator 13 is in the form of a 3-port circulator, where a microwave generator 11 is connected at the first port, the linear accelerator unit 21 at the second port, and a load 13.L at the third port.

Figure 5:
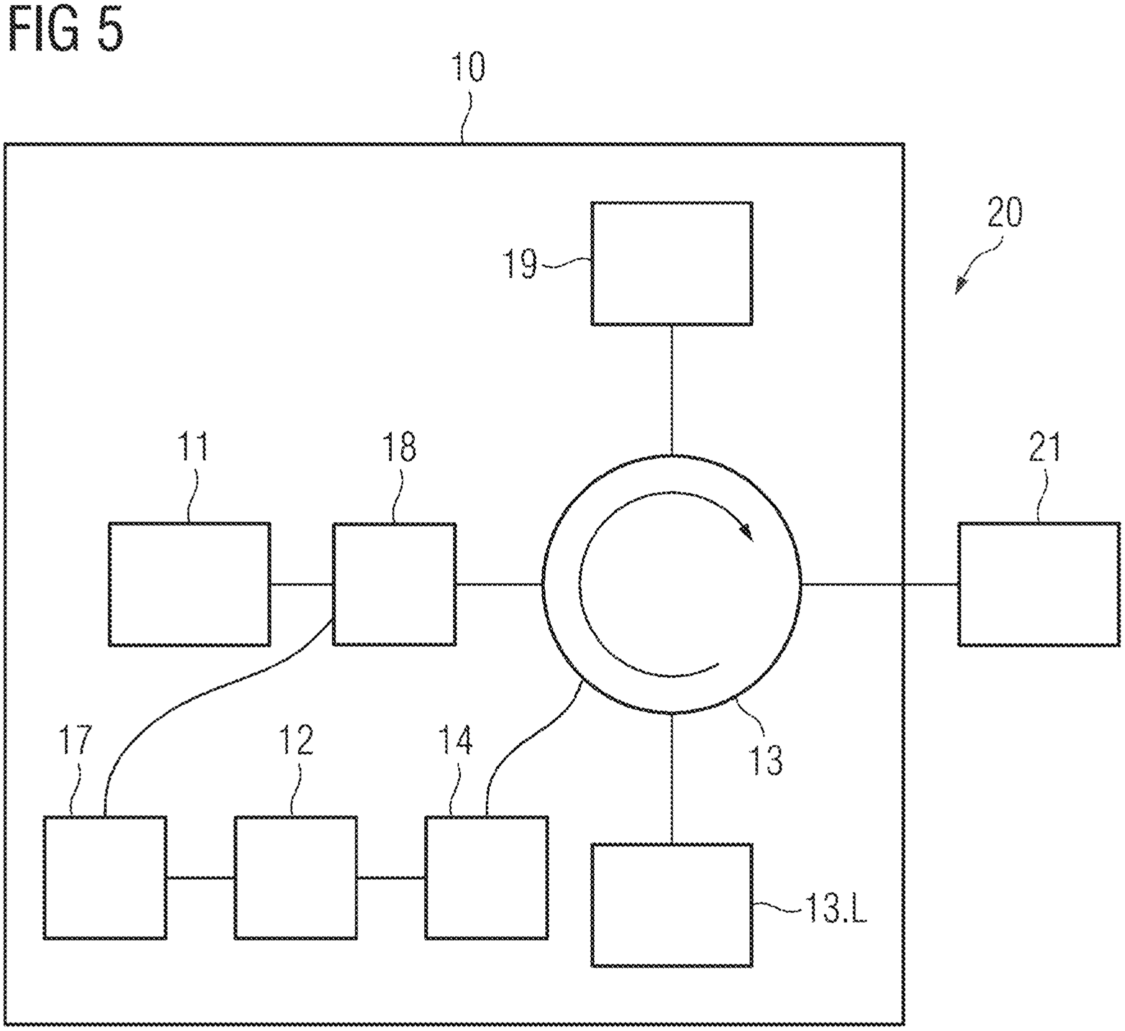
FIG. 5 shows a linear accelerator system according to one or more example embodiments having a 4-port circulator.

FIG. 5 shows a block diagram of a linear accelerator system 20 according to one or more example embodiments of the present invention having a 4-port circulator. Unlike the exemplary embodiment shown in FIG. 4, a reflection phase shifter 19, which is part of the radiofrequency source 10, is connected at the additional port of the circulator 13. Alternatively, a further load can be connected instead of the reflection phase shifter 19. The linear accelerator unit 21 in this exemplary embodiment has a target, which is provided inside the cavities, for producing MeV X-ray radiation on the basis of the accelerated charged particles.

FIG. 5 also shows that a directional coupler 18 for separating the generated microwaves and the backscattered microwaves is provided between the measuring apparatus 17 and the circulator 13.

Figure 6:
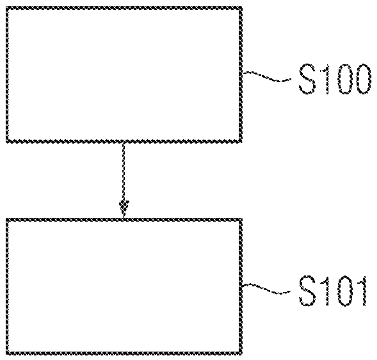
FIG. 6 shows a method according to one or more example embodiments.

FIG. 6 shows a flow diagram of a method according to one or more example embodiments of the present invention for operating a radiofrequency source 10.

Method step S100 denotes receiving in the control unit 12 a measured variable describing a magnetic permeability of the circulator 13.

Method step S101 denotes adjusting in such a way via the control unit 12 a current and/or voltage of the electrical phase stabilization element 14 for influencing the magnetic field according to the measured variable that an amplitude difference between the generated microwaves and the backscattered microwaves is maximized.

Figure 7:
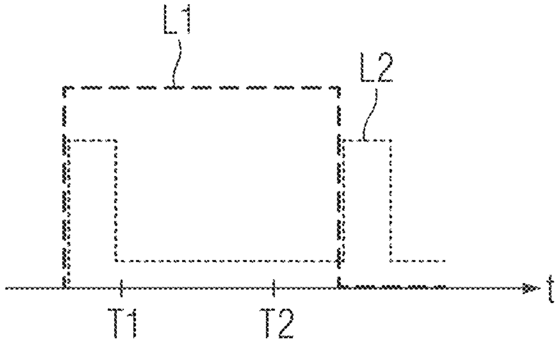
FIG. 7 shows an example of a variation in the radiofrequency power according to one or more example embodiments.

FIG. 7 shows a variation over time of the radiofrequency power of the generated microwaves (L1, dashed line) and of the backscattered microwaves (L2, dotted line) in an example time interval, where the linear accelerator unit is connected as the useful load.

The first rise in L2 typically begins directly at the start of the pulse L1, and in particular is the result of the reflection of the radiofrequency power at the "empty" linear accelerator unit. In other words, there are no charged particles yet in the cavities. The second rise in L2 usually begins at the end of the pulse L1, when the linear accelerator unit is acting briefly as a sort of radiofrequency source.

At time T1, i.e. at the pulse start of the generated microwaves L1, the measured variable of the backscattered microwaves does not depend as a first approximation on the frequency-matching of the microwave generator 11 to the linear accelerator unit 21, and is dominated by the scattering of the generated microwaves.

At time T2, the radiofrequency source 10 is in a steady state, typically after frequency-matching of the microwave generator 11 to the linear accelerator unit 21. The measured variable of the backscattered microwaves is dominated by the input reflection of the circulator 13.

The control loops shown in the following figures work in principle at both times T1 and T2.

Figure 8:
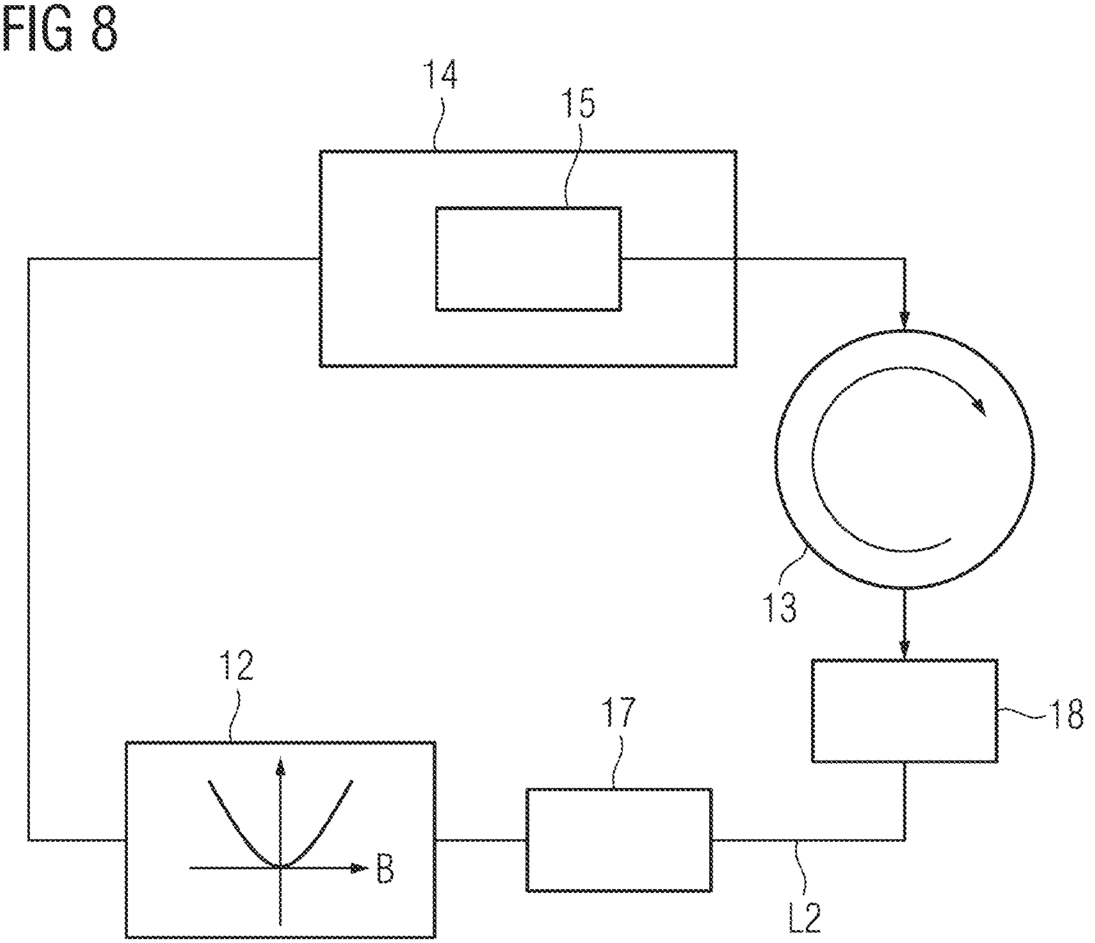
FIG. 8 shows a first control loop of the radiofrequency source according to one or more example embodiments.

FIG. 8 shows a first control loop of the radiofrequency source 10.

Via the directional coupler 18, backscattered microwaves L2 are coupled out of the circulator 13 and measured by the measuring apparatus 17 in order to ascertain the measured variable. The measured variable is transferred to the control unit 12, which minimizes the amplitude of the backscattered microwaves L2 continuously and/or in cycles by adjusting the current and/or voltage of the phase stabilization element 14, thereby maximizing the amplitude difference between the generated microwaves and the backscattered microwaves. The electrical phase stabilization element 14 has an inductive component 15 for this purpose.

Figure 9:
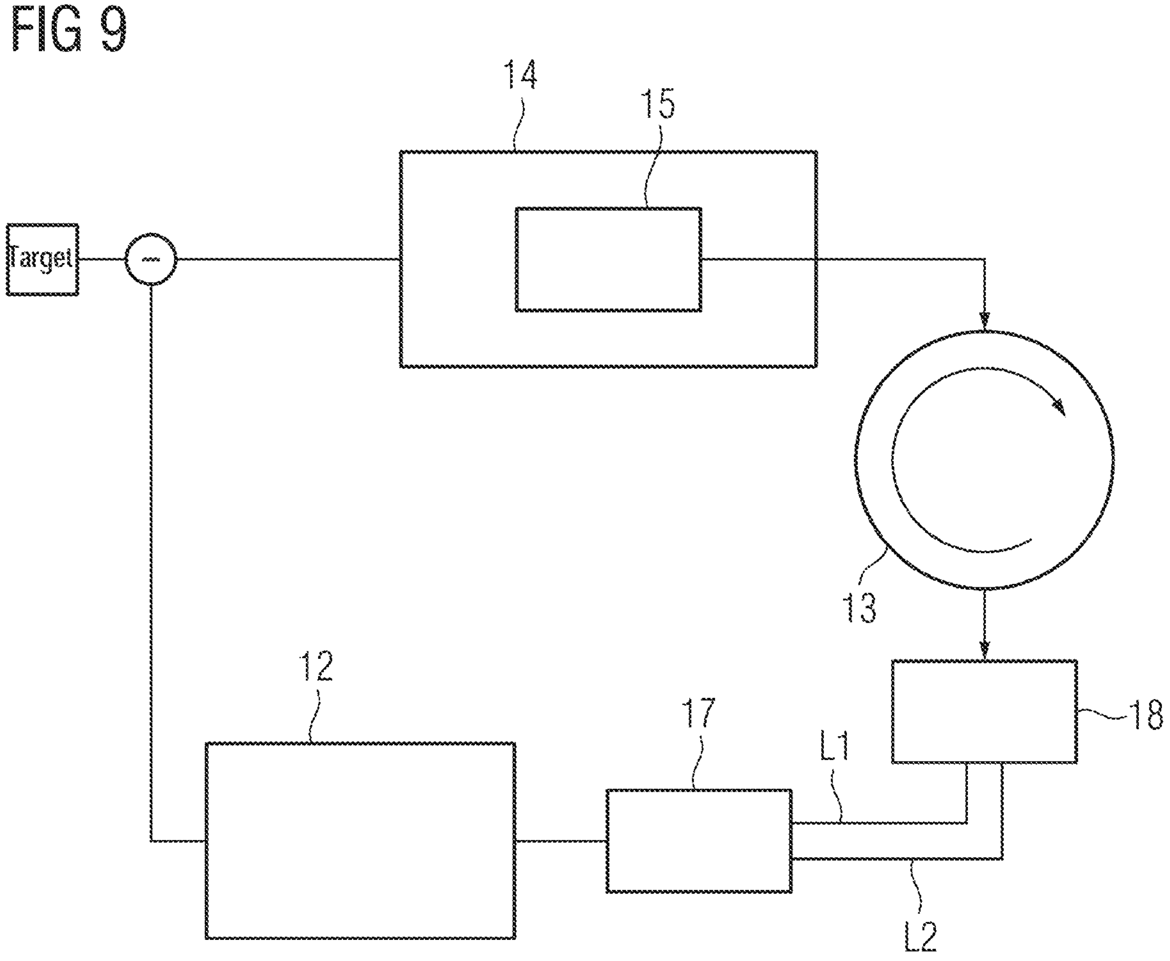
FIG. 9 shows a second control loop of the radiofrequency source according to one or more example embodiments.

FIG. 9 shows a second control loop of the radiofrequency source 10.

In comparison with the first loop, the measuring apparatus 17 measures the generated microwaves L1 and the backscattered microwaves L2 in order to ascertain the measured variable, which in this case describes the phase difference. The control unit 12 adjusts the current and/or voltage of the electrical phase stabilization element 14 in such a way that the phase difference substantially equals a set point.

Figure 10:
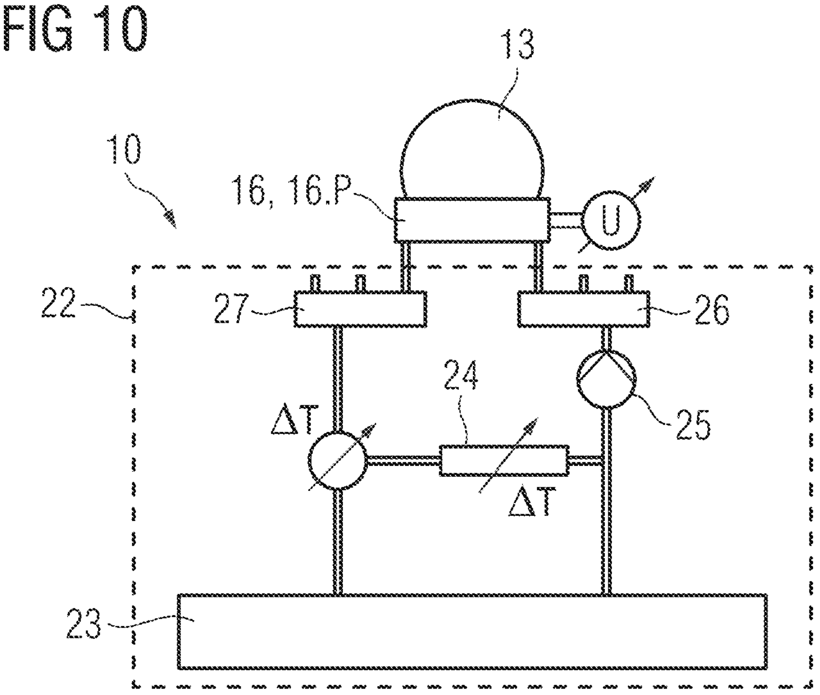
FIG. 10 shows a third exemplary embodiment of the radiofrequency source.
Figure 11:
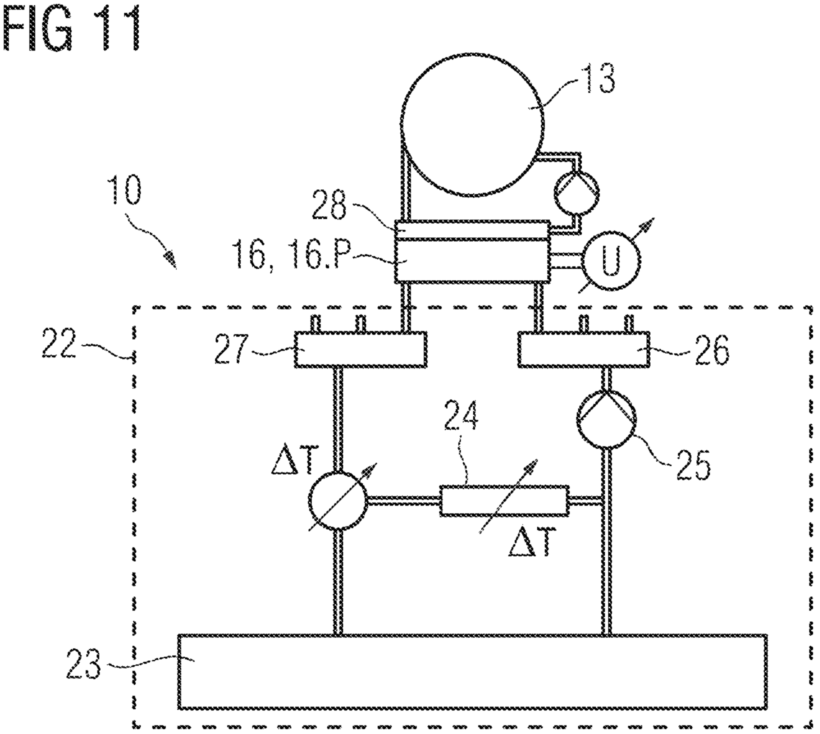
FIG. 11 shows a fourth exemplary embodiment of the radiofrequency source.

FIG. 10 and FIG. 11 show segments of a third and fourth exemplary embodiment of the radiofrequency source 10 having a Peltier-Element 16.P. These two exemplary embodiments are essentially based on the exemplary embodiment of FIG. 2, where a thermoelectric component 16 is used for the closed-loop control of the temperature inside the circulator 13.

In FIG. 10, the Peltier element 16.P is thermally coupled for the purpose of temperature stabilization directly to a cooling system 22 having a relatively low cooling capacity. The coupling between the Peltier element 16.P and the cooling system 22 can be achieved via a heat sink (not shown here). The circulator 13 is thermally coupled directly to the thermoelectric component 16. The cooling system 22 has a first cooling circuit, which comprises a heat exchanger 23, a heater 24, a pump 25, a manifold 25, and a collector 27.

In comparison with the exemplary embodiment shown in FIG. 10, FIG. 11 shows that the circulator 13 is thermally coupled for temperature stabilization directly to the Peltier element 16.P via an intermediate cooling circuit 28.

Figure 12:
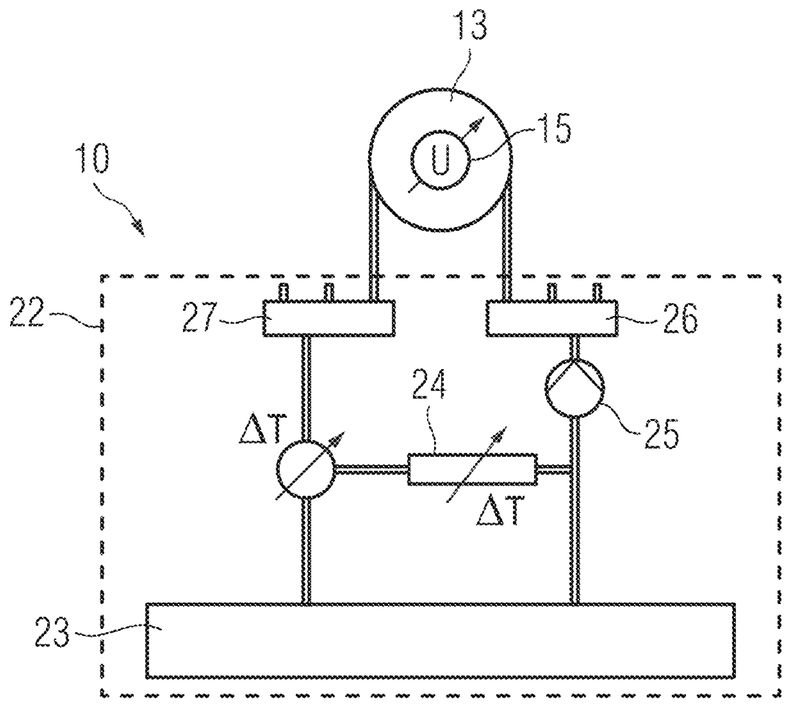
FIG. 12 shows a fifth exemplary embodiment of the radiofrequency source.

FIG. 12 shows a fifth exemplary embodiment of the radiofrequency source 10. In comparison with the exemplary embodiments having the thermoelectric component 16, the cooling system 22 is thermally coupled directly to the circulator 13. Thus the cooling system 22 cools the circulator 13 directly. In particular, the inductive component 15 counterbalances via the influence of the magnetic field the larger temperature working range resulting from the relatively low cooling capacity.

Although the invention has been illustrated and described in detail using the preferred exemplary embodiments, the invention is not limited by the disclosed examples, and a person skilled in the art can derive other variations therefrom that are still covered by the scope of protection of the invention.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein and mentioned above, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module', 'interface' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing system or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium, storage means or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A radiofrequency source for a linear accelerator system, comprising:
- a microwave generator configured to generate microwaves;
- a circulator, the circulator having ferrites to isolate the microwave generator from backscattered microwaves by influencing a phase of the microwaves according to a magnetic field, the circulator including an electrical phase stabilization element;
- a control unit configured to receive a measured variable describing a magnetic permeability of the circulator, the control unit being further configured to adjust at least one of a current of the electrical phase stabilization element or a voltage of the electrical phase stabilization element to influence the magnetic field based on the received measured variable such that an amplitude difference between the generated microwaves and the backscattered microwaves is a maximum; and
- a measuring apparatus configured to measure an electromagnetic variable of the backscattered microwaves, the measured electromagnetic variable being the measured variable describing the magnetic permeability of the circulator and the measured electromagnetic variable describing at least one of an amplitude of the backscattered microwaves or a phase of the backscattered microwaves.

2. The radiofrequency source of claim 1, wherein the electrical phase stabilization element includes,
- a controllable inductive component, the at least one of the adjusted current of the electrical phase stabilization element or the adjusted voltage of the electrical phase stabilization element runs through the controllable inductive component.

3. The radiofrequency source of claim 2, wherein the controllable inductive component has at least one electromagnetic coil.

4. The radiofrequency source of claim 3, wherein the electrical phase stabilization element further includes,
- a permanent magnet, the at least one electromagnetic coil being wound around the permanent magnet.

5. The radiofrequency source of claim 4, wherein the electrical phase stabilization element includes,
- a controllable thermoelectric component configured to control a temperature inside the circulator, the at least one of the adjusted current of the electrical phase stabilization element or the adjusted voltage of the electrical phase stabilization element runs through the controllable thermoelectric component.

6. The radiofrequency source of claim 5, wherein the controllable thermoelectric component is a thermoelectric converter.

7. The radiofrequency source of claim 1, wherein the electrical phase stabilization element includes,
- a controllable thermoelectric component configured to control a temperature inside the circulator, the at least one of the adjusted current of the electrical phase stabilization element or the adjusted voltage of the electrical phase stabilization element runs through the controllable thermoelectric component.

8. The radiofrequency source of claim 7, wherein the controllable thermoelectric component is a thermoelectric converter.

9. The radiofrequency source of claim 1, further comprising:
- a directional coupler configured to separate the generated microwaves and the backscattered microwaves, the directional coupler being between the measuring apparatus and the circulator.

10. A linear accelerator system comprising:
- the radiofrequency source of claim 1; and
- a linear accelerator unit, the linear accelerator unit including,
  - a particle emitter configured to emit charged particles, and
  - cavities configured to accelerate the charged particles via the microwaves.

11. The linear accelerator system of claim 10, wherein the linear accelerator unit includes,
- a target inside the cavities, the target configured to produce MeV X-ray radiation based on the accelerated charged particles.

12. A method for operating the radiofrequency source of claim 1, the method comprising:
- receiving in the control unit the measured variable describing the magnetic permeability of the circulator; and
- adjusting the at least one of the current of the electrical phase stabilization element or the voltage of the electrical phase stabilization element such that the amplitude difference between the generated microwaves and the backscattered microwaves is maximized.

13. A non-transitory computer program product having program code that, when executed by a control unit, cause the control unit to perform the method of claim 12.

14. The radiofrequency source of claim 1, wherein the microwave generator comprises at least one of a magnetron or a klystron.

15. The radiofrequency source of claim 1, wherein the microwave generator is configured to generate an alternating magnetic field between 1 GHz and 10 GHz.

16. The radiofrequency source of claim 1, wherein the microwave generator is configured to generate an alternating magnetic field between 2 GHz and 4 GHz.

17. The radiofrequency source of claim 1, wherein the circulator includes at least three ports, a first port of the circulator is connected to the microwave generator, a second port of the circulator is connected to a useful load, and a third port of the circulator is connected a load for absorbing the backscattered microwaves.

18. The radiofrequency source of claim 17, wherein the useful load is a linear accelerator of the linear accelerator system.

* * * * *